United States Patent
Bullinger et al.

(10) Patent No.: US 10,513,935 B2
(45) Date of Patent: Dec. 24, 2019

(54) METHOD FOR PRODUCING AND RESTORING CERAMIC HEAT INSULATION COATINGS IN GAS TURBINES AND ASSOCIATED GAS TURBINE

(71) Applicant: SIEMENS AKTIENGESELLSCHAFT, München (DE)

(72) Inventors: Patrick Bullinger, Nürnberg (DE); Martin Grosshäuser, Erlangen (DE); Andreas Pahl, Düsseldorf (DE); Dietmar Reiermann, Potsdam (DE); Michael Rindler, Schöneiche (DE); Werner Stamm, Mülheim an der Ruhr (DE)

(73) Assignee: SIEMENS AKTIENGESELLSCHAFT (DE)

( * ) Notice: Subject to any disclaimer, the term of this patent is extended or adjusted under 35 U.S.C. 154(b) by 564 days.

(21) Appl. No.: 14/388,888

(22) PCT Filed: Dec. 18, 2012

(86) PCT No.: PCT/EP2012/075888
§ 371 (c)(1),
(2) Date: Sep. 29, 2014

(87) PCT Pub. No.: WO2013/143631
PCT Pub. Date: Oct. 3, 2013

(65) Prior Publication Data
US 2015/0071772 A1 Mar. 12, 2015

(30) Foreign Application Priority Data
Mar. 28, 2012 (DE) .................................. 121 61 760

(51) Int. Cl.
*F01D 5/28* (2006.01)
*C23C 4/02* (2006.01)
(Continued)

(52) U.S. Cl.
CPC ............. *F01D 5/288* (2013.01); *B05D 3/002* (2013.01); *C23C 4/02* (2013.01); *C23C 4/11* (2016.01);
(Continued)

(58) Field of Classification Search
CPC .......... F01D 5/005; F01D 5/284; F01D 5/288; F01D 9/02; F05D 2230/31;
(Continued)

(56) References Cited

U.S. PATENT DOCUMENTS

| | | | |
|---|---|---|---|
| 5,154,885 A | 10/1992 | Czech et al. | |
| 5,401,307 A | 3/1995 | Czech et al. | |

(Continued)

FOREIGN PATENT DOCUMENTS

| | | |
|---|---|---|
| CA | 2414019 | 6/2003 |
| CN | 101356137 A | 1/2009 |

(Continued)

OTHER PUBLICATIONS

International Search Report dated Mar. 25, 2013 issued in corresponding International patent application No. PCT/EP2012/075888.
(Continued)

*Primary Examiner* — Moshe Wilensky
*Assistant Examiner* — Jesse M Prager
(74) *Attorney, Agent, or Firm* — Ostrolenk Faber LLP

(57) ABSTRACT

Through the use of different ceramic heat insulation coatings (7, 13) on turbine blades, it is possible to produce or restore different configurations of gas turbines, which are then optimized for a respective baseload operation application or peak load operation application. Differences in the sprayed-
(Continued)

on heat insulation coatings (7, 13) can be generated by means of a different material composition of the powder, for example zirconium oxide, by means of a different number of layers (10), by means of different coating thicknesses and/or by means of different porosities.

12 Claims, 3 Drawing Sheets

(51) Int. Cl.
    *F01D 5/00* (2006.01)
    *C23C 28/00* (2006.01)
    *B05D 3/00* (2006.01)
    *F01D 9/02* (2006.01)
    *C23C 4/11* (2016.01)

(52) U.S. Cl.
    CPC ........ *C23C 28/3215* (2013.01); *C23C 28/345* (2013.01); *C23C 28/3455* (2013.01); *F01D 5/005* (2013.01); *F01D 5/284* (2013.01); *F01D 9/02* (2013.01); *F05D 2230/80* (2013.01); *F05D 2230/90* (2013.01); *F05D 2260/231* (2013.01); *F05D 2300/2118* (2013.01); *Y02T 50/6765* (2018.05)

(58) Field of Classification Search
    CPC ....... F05D 2260/231; F05D 2300/2118; F05D 2230/311; F05D 2230/312; F05D 2230/313; F05D 2230/80; F05D 2230/90; C23C 4/02; B05D 3/002
    See application file for complete search history.

(56) References Cited

U.S. PATENT DOCUMENTS

| | | |
|---|---|---|
| 5,993,980 A | 11/1999 | Schmitz et al. |
| 6,024,792 A | 2/2000 | Kurz et al. |
| 6,231,692 B1 | 5/2001 | Vogt et al. |
| 6,764,771 B1 | 7/2004 | Heimberg et al. |
| 6,887,044 B2 | 5/2005 | Fleck et al. |
| 6,924,046 B2 | 8/2005 | Stamm |
| 7,005,015 B2 | 2/2006 | Burgel et al. |
| 2002/0028344 A1 | 3/2002 | Beele |
| 2004/0011439 A1 | 1/2004 | Corrigan et al. |
| 2004/0033884 A1 | 2/2004 | Wallar |
| 2004/0057832 A1 | 3/2004 | Fleck et al. |
| 2009/0081445 A1 | 3/2009 | Lampenscherf et al. |
| 2009/0324841 A1 | 12/2009 | Arrell et al. |
| 2010/0108745 A1 | 5/2010 | Heinz et al. |
| 2012/0003460 A1* | 1/2012 | Stamm .................. F01D 5/288 428/220 |
| 2012/0027931 A1 | 2/2012 | Ladru et al. |

FOREIGN PATENT DOCUMENTS

| | | |
|---|---|---|
| DE | 43 02 167 C1 | 2/1994 |
| DE | 4302167 | 2/1994 |
| EP | 0486489 | 11/1994 |
| EP | 0 816 526 A2 | 1/1998 |
| EP | 0412397 | 3/1998 |
| EP | 0892090 | 1/1999 |
| EP | 0786017 | 3/1999 |
| EP | 1 247 941 A1 | 10/2002 |
| EP | 1247941 | 10/2002 |
| EP | 1306454 | 5/2003 |
| EP | 1319729 | 6/2003 |
| EP | 1 204 776 | 6/2004 |
| EP | 1 806 430 A1 | 7/2007 |
| EP | 0186430 | 7/2007 |
| EP | 1 967 312 | 9/2008 |
| WO | WO 96/12049 | 4/1996 |
| WO | WO 96/12049 A1 | 4/1996 |
| WO | WO 98/26110 | 6/1998 |
| WO | WO 99/23278 | 5/1999 |
| WO | WO 9967435 | 12/1999 |
| WO | WO 0044949 | 8/2000 |
| WO | WO 2007/112783 A1 | 10/2007 |
| WO | WO 2007112783 | 10/2007 |
| WO | WO-2010105929 A1 * | 9/2010 ............. F01D 5/288 |

OTHER PUBLICATIONS

Written Opinion dated Mar. 25, 2013 issued in corresponding International patent application No. PCT/EP2012/07588.
EP Search Report dated Aug. 13, 2012 corresponding to EP 2011P23901EP. (9 pages).
WO Search Report dated Mar. 25, 2013 corresponding to WO 2011P23901WO. (14 pages).
Chinese Office Action dated May 6, 2015 corresponding to Chinese Application No. 201280072005.4 (with English translation).

* cited by examiner

METHOD FOR PRODUCING AND RESTORING CERAMIC HEAT INSULATION COATINGS IN GAS TURBINES AND ASSOCIATED GAS TURBINE

CROSS-REFERENCE TO RELATED APPLICATIONS

The present application is a 35 U.S.C. §§ 371 National Phase conversion of PCT/EP2012/075888, filed Dec. 18, 2012, which claims priority of European Patent Application No. 12161760.9, filed Mar. 28, 2012, the contents of which are incorporated by reference herein. The PCT International Application was published in the German language.

TECHNICAL FIELD

The invention relates to a process for producing gas turbines of flexible design, to gas turbines and to methods for operating gas turbines.

TECHNICAL BACKGROUND

For generating electricity, gas turbines can be operated in base load operation or in particular in peak load operation.

The demands on the respective conditions are different.

An optimized configuration of the gas turbine which satisfies both demands would always represent a compromise.

It is therefore an object of the invention to solve this problem.

The object is achieved by a process for producing gas turbines as disclosed herein and by a method as disclosed herein.

The dependent claims list further advantageous measures which can be combined with one another, as desired, in order to achieve further advantages.

DESCRIPTION OF AN EMBODIMENT

The description represents merely an exemplary embodiment of the invention.

A maintenance interval for gas turbines 100 (FIG. 6) is determined by ascertaining the operational hours and starts, which are dependent on the mode of operation and specific factors. The maintenance is to be carried out in each case once the hour or start limit has been reached.

If, depending on the field of use of the gas turbine, it is then necessary to carry out maintenance or if the use demands reconditioning or another use beforehand, the configuration of the gas turbine 100 is altered.

Definitions of the Terms

First gas turbine has first turbine blade or vane with first thermal barrier coating.

Second gas turbine has turbine blades or vanes with ceramic thermal barrier coatings, a) in which the first turbine blades or vanes (=second turbine blade or vane) and/or b) new, unconsumed turbine blades or vanes (=new, second turbine blades or vanes) are used, and in each case have a second thermal barrier coating which can be clearly distinguished from the first thermal barrier coating.

Figure 1:
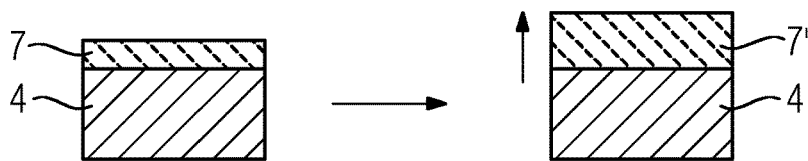
FIGS. 1-3 show an exemplary embodiment of the invention.

If a single-layer thermal barrier coating was present in operation beforehand in said first gas turbine, as described above, a two-layer (FIG. 3), a thicker (FIG. 1) or a more porous ceramic thermal barrier coating is used for the turbine blades or vanes 120, 130 for the renewed use in base load operation.

The origin (the same substrate) of the turbine blades or vanes for the second gas turbine can be the first turbine blades or vanes of the first gas turbine or other gas turbines, which were already in use, have been appropriately refurbished and give rise to second turbine blades or vanes through recoating, or can be new, second turbine blades or vanes, in which newly produced (newly cast) turbine blades or vanes which have not yet been used are coated differently to the first turbine blades or vanes of the first gas turbine.

Figure 2:

Similarly, it is possible, if the gas turbine 100 had a two-layer ceramic thermal barrier coating on the turbine blades or vanes 120, 130 in base load operation, to apply a single-layer TBC, such that it can then be used in peak load operation (daily starter) (FIG. 2).

For peak load operation, it is preferable to use only a single-layer ceramic coating with a uniform porosity. For peak load operation, the ceramic thermal barrier coating on the turbine blades or vanes 120, 130 preferably has a high porosity of 18%±4%.

Figure 3:
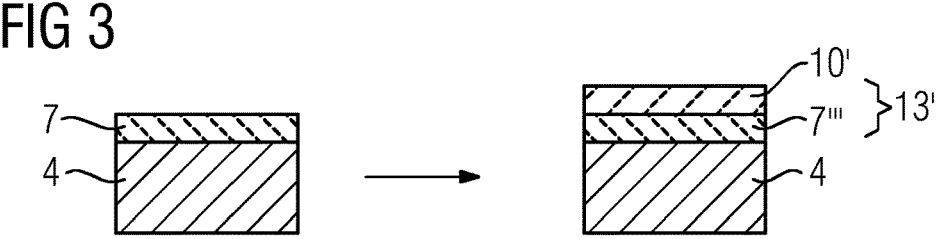

In base load operation (base loader), however, a two-layer thermal barrier coating 13 is used (FIG. 3).

It is preferable to use agglomerated, sintered powder as starting powder for the ceramic coatings 7', 7", 7''', 10', 13'.

Each ceramic sprayed coating is applied in coating layers. Two-layer nature means, however, that a second layer differs from a first, underlying layer in terms of porosity and/or microstructure and/or chemical composition.

A ceramic layer 7 with a porosity of 12%±4% which preferably has a coating thickness of 75 μm to 150 μm is preferably used as the bottom layer.

A layer with a porosity of 18%±4% is sprayed or is present thereabove as the outer ceramic layer 10.

The difference in the porosity is, however, at least 2%, in particular at least 4%. Variations in the porosity during production are known. No variations are to be recorded within a charge, i.e. a blade or vane set.

A ceramic layer 7 with a porosity of 12%±4% which preferably has a coating thickness of 75 μm to 150 μm is similarly preferably used as the bottom layer.

A layer with a porosity of 18%±4% is sprayed or is present thereabove as the outer ceramic layer 10.

The difference in the porosity is, however, at least 2%, in particular at least 4%. Variations in the porosity during production are known. No variations are to be recorded within a charge, i.e. a blade or vane set.

A ceramic layer 7 with a porosity of 18%±4% which preferably has a coating thickness of 75 μm to 150 μm is similarly preferably used as the bottom layer.

A layer with a porosity of 25%±4% is sprayed or is present thereabove as the outer ceramic layer 10.

The difference in the porosity is, however, at least 2%, in particular at least 4%. Variations in the porosity during production are known. No variations are to be recorded within a charge, i.e. a blade or vane set.

In order to generate porosities in ceramic coatings or ceramic layers (FIGS. 1-3), the spraying can involve the use of coarse grains and use can be made of polymers or smaller grains with polymer, coarse meaning an at least 20% greater mean particle diameter.

A two-layer ceramic coating 7, 10 can be produced using different spraying processes: the bottom layer 7 is sprayed without polymer and the top layer 10 is sprayed with polymer.

Figure 4:
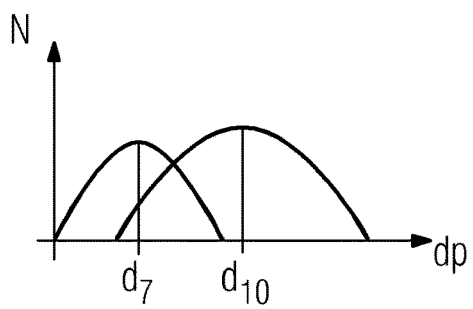
FIG. 4 shows a pore distribution of a ceramic coating.

This gives rise to larger pores in the top layer 10, i.e. the mean pore diameter $d_{10}$ increases compared to the mean pore diameter $d_7$ of the bottom layer 7 (FIG. 4). This is not necessarily the case. A higher porosity is often only achieved by a higher number of pores of the same pore size.

It is preferable that the same powder is used in this case, i.e. also an identical grain size distribution.

Zirconium oxide ($ZrO_2$) for the ceramic layers of the thermal barrier coatings preferably has a monoclinic proportion of 3%, in particular 1.5%. A ceramic layer or coating 7, 7', 10, 13 (FIGS. 1-3) on the turbine blade or vane 120, 130 then has corresponding proportions.

The minimum proportion of the monoclinic phase is at least 1%, in particular 0.5%, so as not to excessively increase the costs of the powder.

The change in the configuration of the first thermal barrier coating 7', 7", 13' virtually produces another, second gas turbine optimized for its field of use.

Figure 5:
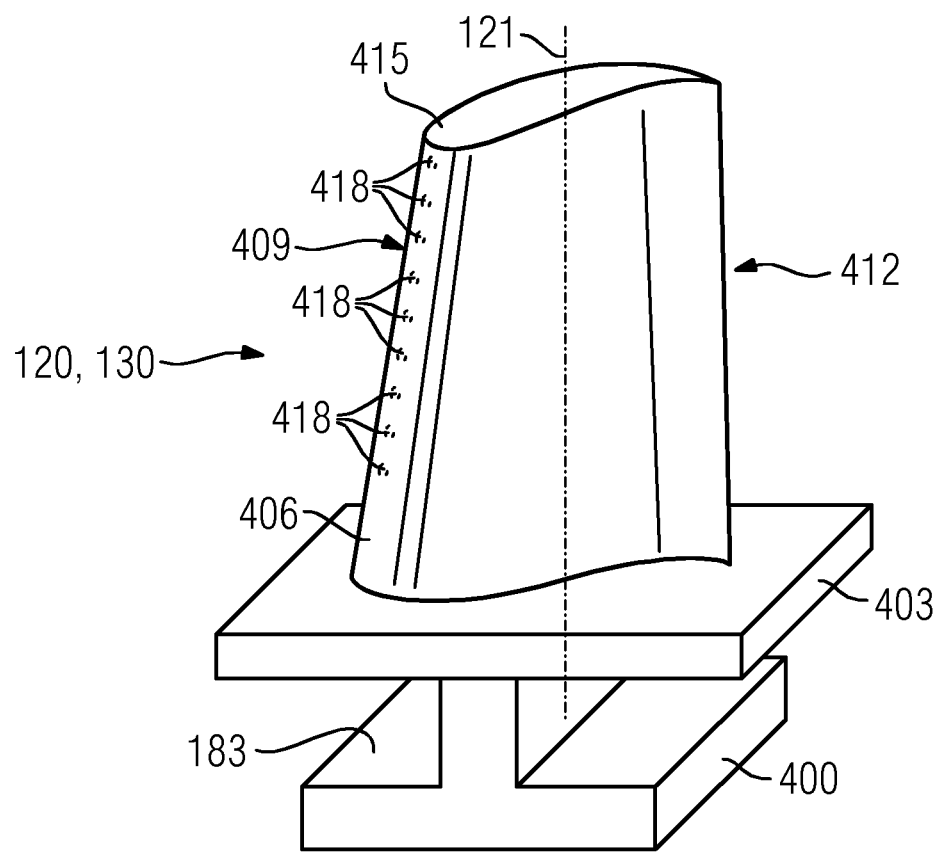
FIG. 5 shows a turbine blade or vane.

FIG. 5 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403, a main blade or vane part 406 and a blade or vane tip 415.

As a guide vane 130, the vane 130 may have a further platform (not shown) at its vane tip 415.

A blade or vane root 183, which is used to secure the rotor blades 120, 130 to a shaft or a disk (not shown), is formed in the securing region 400.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949.

The blade or vane 120, 130 may in this case be produced by a casting process, also by means of directional solidification, by a forging process, by a milling process or combinations thereof.

Workpieces with a single-crystal structure or structures are used as components for machines which, in operation, are exposed to high mechanical, thermal and/or chemical stresses. Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures).

Processes of this type are known from U.S. Pat. No. 6,024,792 and EP 0 892 090 A1.

The blades or vanes 120, 130 may likewise have coatings protecting against corrosion or oxidation, e.g. (MCrAlX; M is at least one element selected from the group consisting of iron (Fe), cobalt (Co), nickel (Ni), X is an active element and stands for yttrium (Y) and/or silicon and/or at least one rare earth element, or hafnium (Hf)). Alloys of this type are known from EP 0 486 489 B1, EP 0 786 017 B1, EP 0 412 397 B1 or EP 1 306 454 A1.

The density is preferably 95% of the theoretical density.

A protective aluminum oxide layer (TGO=thermally grown oxide layer) is formed on the MCrAlX layer (as an intermediate layer or as the outermost layer).

The layer preferably has a composition Co-30Ni-28Cr-8Al-0.6Y-0.7Si or Co-28Ni-24Cr-10Al-0.6Y. In addition to these cobalt-based protective coatings, it is also preferable to use nickel-based protective layers, such as Ni-10Cr-12Al-0.6Y-3Re or Ni-12Co-21Cr-11Al-0.4Y-2Re or Ni-25Co-17Cr-10Al-0.4Y-1.5Re.

It is also possible for a thermal barrier coating, which is preferably the outermost layer and consists for example of $ZrO_2$, $Y_2O_3$—$ZrO_2$, i.e. unstabilized, partially stabilized or fully stabilized by yttrium oxide and/or calcium oxide and/or magnesium oxide, to be present on the MCrAlX.

The thermal barrier coating covers the entire MCrAlX layer. Columnar grains are produced in the thermal barrier coating by suitable coating processes, such as for example electron beam physical vapor deposition (EB-PVD).

Other coating processes are possible, for example atmospheric plasma spraying (APS), LPPS, VPS or CVD. The thermal barrier coating may include grains that are porous or have micro-cracks or macro-cracks, in order to improve the resistance to thermal shocks. The thermal barrier coating is therefore preferably more porous than the MCrAlX layer.

Refurbishment means that after they have been used, protective layers may have to be removed from components 120, 130 (e.g. by sand-blasting). Then, the corrosion and/or oxidation layers and products are removed. If appropriate, cracks in the component 120, 130 are also repaired. This is followed by recoating of the component 120, 130, after which the component 120, 130 can be reused.

The blade or vane 120, 130 may be hollow or solid in form. If the blade or vane 120, 130 is to be cooled, it is hollow and may also have film-cooling holes 418 (indicated by dashed lines).

Figure 6:
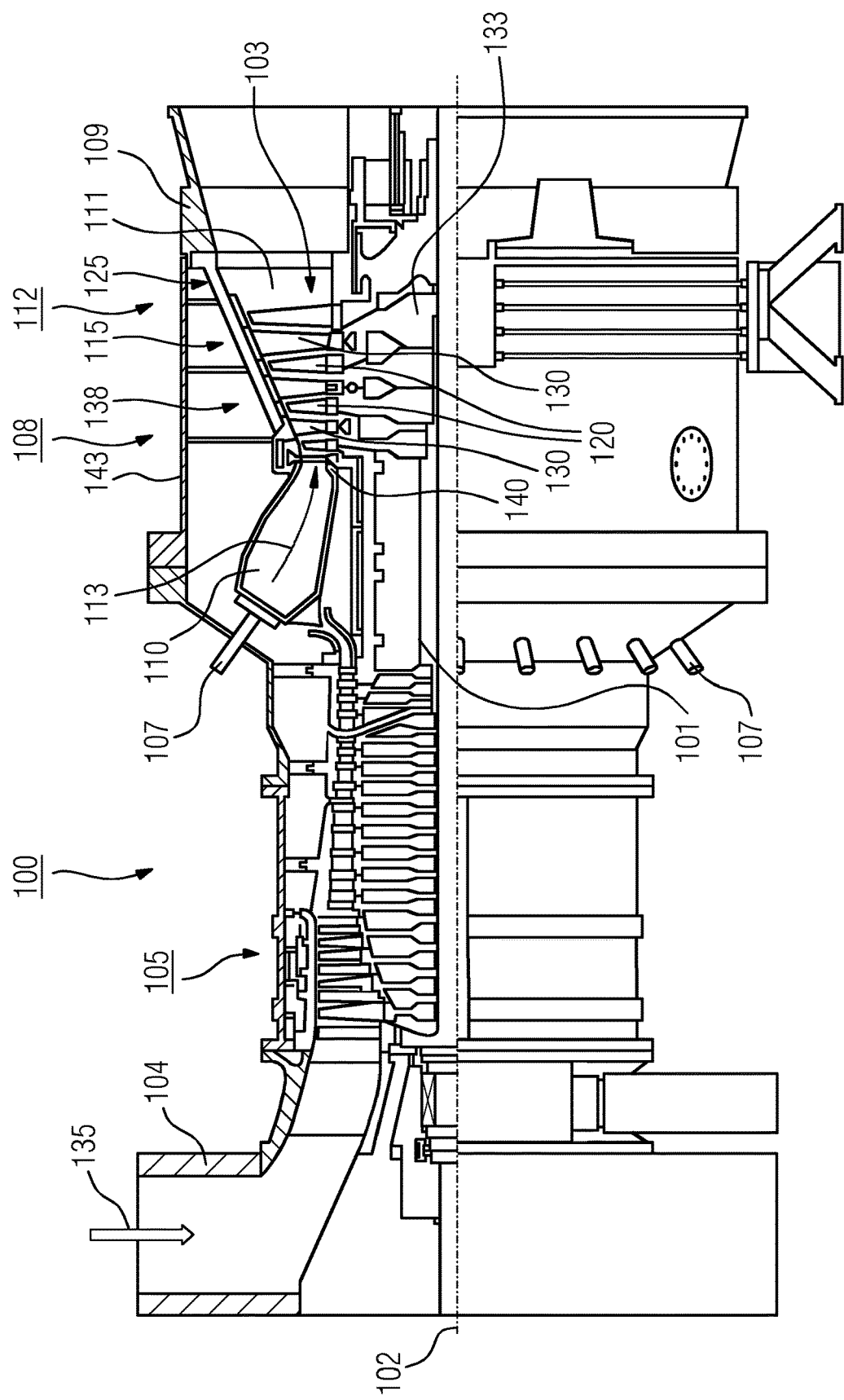
FIG. 6 shows a gas turbine.

FIG. 6 shows, by way of example, a partial longitudinal section through a gas turbine 100.

In the interior, the gas turbine 100 has a rotor 103 with a shaft 101 which is mounted such that it can rotate about an axis of rotation 102 and is also referred to as the turbine rotor.

An intake housing 104, a compressor 105, a, for example, toroidal combustion chamber 110, in particular an annular combustion chamber, with a plurality of coaxially arranged burners 107, a turbine 108 and the exhaust-gas housing 109 follow one another along the rotor 103.

The annular combustion chamber 110 is in communication with a, for example, annular hot-gas passage 111, where, by way of example, four successive turbine stages 112 form the turbine 108.

Each turbine stage 112 is formed, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133.

A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield elements which line the annular combustion chamber 110, are subject to the highest thermal stresses.

To be able to withstand the temperatures which prevail there, they may be cooled by means of a coolant.

Substrates of the components may likewise have a directional structure, i.e. they are in single-crystal form (SX structure) or have only longitudinally oriented grains (DS structure). By way of example, iron-based, nickel-based or cobalt-based superalloys are used as material for the components, in particular for the turbine blade or vane 120, 130 and components of the combustion chamber 110.

Superalloys of this type are known, for example, from EP 1 204 776 B1, EP 1 306 454, EP 1 319 729 A1, WO 99/67435 or WO 00/44949.

The blades or vanes 120, 130 may likewise have coatings protecting against corrosion (MCrAlX; M is at least one element selected from the group consisting of iron (Fe), cobalt (Co), nickel (Ni), X is an active element and stands for yttrium (Y) and/or silicon, scandium (Sc) and/or at least one rare earth element, or hafnium). Alloys of this type are known from EP 0 486 489 B1, EP 0 786 017 B1, EP 0 412 397 B1 or EP 1 306 454 A1.

A thermal barrier coating, consisting for example of $ZrO_2$, $Y_2O_3$—$ZrO_2$, i.e. unstabilized, partially stabilized or fully stabilized by yttrium oxide and/or calcium oxide and/or magnesium oxide, may also be present on the MCrAlX.

Columnar grains are produced in the thermal barrier coating by suitable coating processes, such as for example electron beam physical vapor deposition (EB-PVD). The guide vane 130 has a guide vane root (not shown here), which faces the inner housing 138 of the turbine 108, and a guide vane head which is at the opposite end from the guide vane root. The guide vane head faces the rotor 103 and is fixed to a securing ring 140 of the stator 143.

The invention claimed is:

1. A process for operating a second gas turbine using first turbine blades or vanes of a first gas turbine comprising:
   providing first turbine blades or vanes of the first gas turbine having either a single-layer first ceramic thermal barrier coating previously operated at peak load operations or a two-layer first ceramic thermal barrier coating previously operated at base load operations,
   removing the first ceramic thermal barrier coating from the first turbine blades or vanes of the first gas turbine to produce uncoated first turbine blades or vanes;
   applying a second ceramic thermal barrier coating to the uncoated first turbine blades or vanes to produce second turbine blades or vanes;
   operating the second turbine blades or vanes at base load operations with a bottom layer having a porosity of 12% to 16% and a top layer having a porosity of 18%±4%, or the bottom layer having a porosity of 18%±4% and the top layer having a porosity of 25%±4%, when the removed first ceramic thermal barrier coating was the single-layer ceramic barrier coating configured for peak load operations,
   wherein, when applied, at least the top layer is comprised of partially stabilized zirconium oxide,
   operating the second turbine blades or vanes at peak load operations with a uniform porosity of 18%±4% when the removed first ceramic thermal barrier coating was a two-layer first ceramic thermal barrier coating configured for base load operations.

2. The process as claimed in claim 1, wherein the absolute difference in the porosity of the bottom and the top layers is at least 2%, when the two-layer second ceramic thermal barrier coating is applied,
   wherein the first turbine blades or vanes have a single layer first ceramic thermal barrier coating.

3. The process as claimed in claim 1, wherein, when applied, the bottom layer of the applied two-layer second ceramic thermal barrier coating is thinner than the top layer thereof; and
   the bottom layer of the applied two-layer second ceramic thermal barrier coating has a thickness of 75 μm to 150 μm,
   wherein the first turbine blades or vanes have a single layer first ceramic thermal barrier coating.

4. The process as claimed in claim 1, wherein the bottom layer is comprised of partially stabilized zirconium oxide.

5. The process as claimed in claim 1, wherein the zirconium oxide is sprayed with a powder having a monoclinic proportion of less than 3%.

6. The process as claimed in claim 4, wherein a tetragonal proportion has the greatest proportion of zirconium oxide.

7. The process as claimed in claim 5, further comprising applying a heat treatment to reduce the monoclinic proportion of the zirconium oxide powder to be sprayed by at least 50%.

8. The process as claimed in claim 1, wherein, when applied, the applied two-layer second ceramic thermal barrier coating is applied by spraying a bottom layer without a polymer and spraying a top layer with a polymer, wherein the first turbine blades or vanes have a single layer first ceramic thermal barrier coating.

9. The process as claimed in claim 1, wherein, when applied, the top layer of the applied two-layer second ceramic thermal barrier coating has pores with a mean pore diameter and the bottom ceramic layer has pores with a mean pore diameter, and the mean pore diameter of the top layer is greater than the mean pore diameter of the bottom layer.

10. The process as claimed in claim 1, wherein, when applied, a same powder with a same composition and a same grain size distribution is used in applying the two-layer second ceramic thermal barrier coating, wherein the first turbine blades or vanes have a single layer first ceramic thermal barrier coating.

11. The process as claimed in claim 1, wherein, when applied, the bottom ceramic layer and the top ceramic layer of the applied two-layer second ceramic thermal barrier coating are comprised of different materials, wherein the first turbine blades or vanes have a single layer first ceramic thermal barrier coating.

12. The process as claimed in claim 2, wherein the absolute difference in the porosity of the top and the bottom layers is at most 4%, wherein the first turbine blades or vanes have a single layer first ceramic thermal barrier coating.

\* \* \* \* \*